Figure 1:
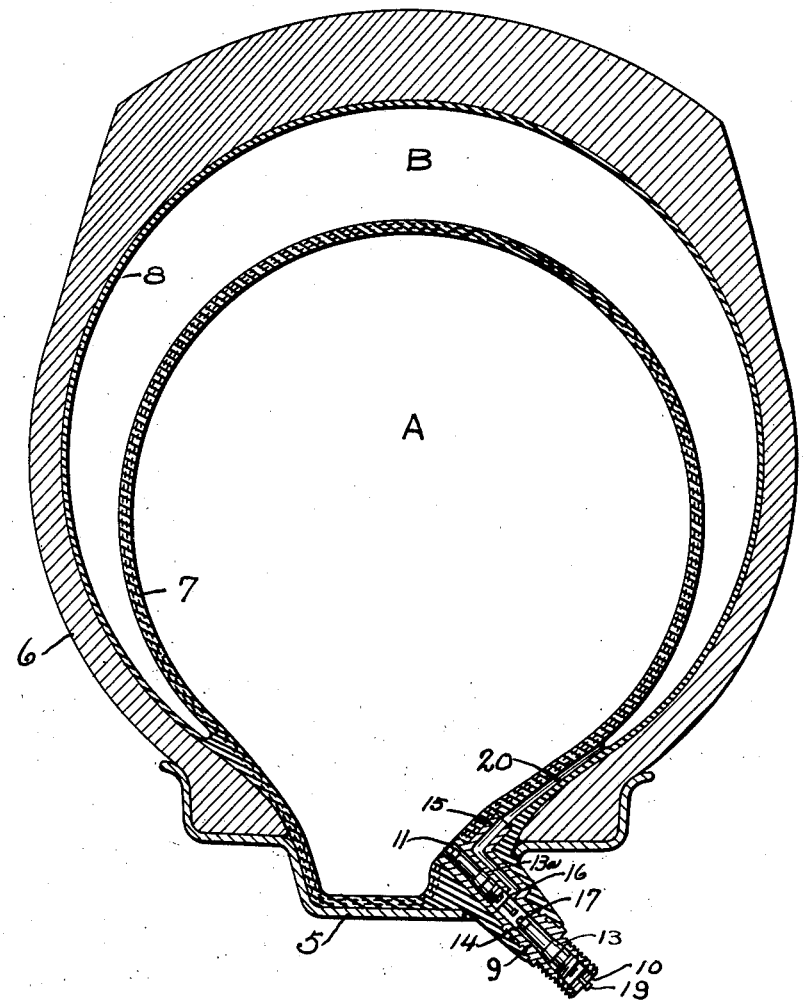

July 5, 1938.　　A. E. ECKENROTH　　2,122,740

VALVE STEM

Filed May 22, 1937

INVENTOR
Alfred E. Eckenroth
BY
Martin E. Anderson
ATTORNEY

Patented July 5, 1938

2,122,740

UNITED STATES PATENT OFFICE 2,122,740

VALVE STEM

Alfred E. Eckenroth, Denver, Colo.

Application May 22, 1937, Serial No. 144,145

6 Claims. (Cl. 277—1)

This invention relates to improvements in duplex inner tubes and has reference more particularly to an improved valve stem and valve assembly for use with such tubes.

Until the advent of the high speed automobile, practically all automobile casings had a single inner tube which was depended upon to retain the air. It is evident that if such single inner tube is punctured, the tire will become "flat" and useless and the vehicle must be stopped or driven slowly to the nearest curb or parking place where the now useless tire must be removed and replaced by a fully inflated one. If the vehicle is driven for even a short distance with a completely deflated tire, the casing, and sometimes the inner tube, will become severely damaged.

If instead of punctures that result in slow leaks and which may often be detected by an experienced driver before the tire becomes entirely deflated, a blow-out occurs, a great danger is incurred, especially when traveling at high speeds as many now do. The sudden deflation caused by a blow-out has a tendency to make the car unsteerable, if the blow-out occurs in a front wheel and if it occurs on a rear wheel the sudden reduction in the diameter of one of the wheels has a tendency to make the vehicle turn over.

Attempts have been made to remedy this defect by employing two or more inner tubes in each tire. It is evident that if two inner tubes are used in each tire and if they are separately inflated to the same pressure and are not in communication with each other, one of these tubes may be completely deflated and the remaining tube will expand and fill the tire casing and if both of the inner tubes are of the same capacity, the pressure will be reduced to one-half, and this will still be of great assistance in preventing accidents.

There are, however, many objections to multiple tubes of the kind at present used. It is not my intention, however, to enumerate here the different types of multiple and duplex inner tubes that have been invented and to point out their faults, but rather to describe one type of duplex tube and to describe how my improved valve stem and valve assembly will improve the operation thereof and facilitate the inflation and deflation thereof.

The inner tube shown in my drawing for the purpose of illustration, is a duplex tube comprising in effect two tubes of different diameters, the smaller being positioned inside the larger and the two tubes are not in communication with each other except through the valve stem that forms the subject of my invention and which will hereinafter be described. The smaller inner tube may be made of cord fabric so as to be in effect a small tire and the larger tube may be made of the usual material. Both of the tubes may be made of elastic rubber if desired.

Instead of the type of inner tube briefly described above, a duplex tube of the type shown in U. S. Patent No. 2,039,343 may be used.

The valve stem and valve assembly to which this invention relates may be briefly described as follows:

The main portion of the stem consists of a straight tubular member in which are positioned two ordinary valve insides. These insides are spaced a short distance apart and open in the same direction so as to be in series with each other. The inner end of this valve stem communicates the interior of the inner of the two tubes or with one of them. The valve stem has an integral lateral tubular projection that communicates with the interior of the other of the tubes and with the interior of the valve stem at a point between the valves. The outer valve is provided with means for opening the inner valve. When the outer valve is moved to open position as it will be during inflation, it will open the inner valve and the air may therefore freely enter both of the tubes. If it is desired to inflate the tubes, the outer valve is moved to open position in the usual manner and this opens the inner valve so that both tubes will deflate simultaneously.

Figure 2:
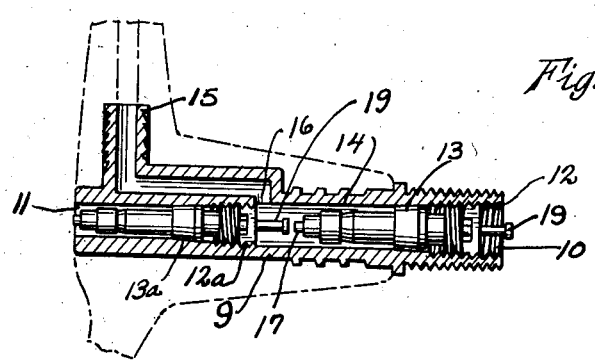

Having thus briefly described the invention, it will now be described in detail, and for this purpose reference will be had to the accompanying drawing in which the invention has been illustrated and in which:

Figure 1 is a transverse section through a duplex inner tube showing the same equipped with my improved valve stem and valve assembly; and Figure 2 is a longitudinal section through the valve stem, the parts being shown to an enlarged scale.

In the drawing, reference numeral 5 designates an ordinary drop rim to which the tire casing 6 is secured in the usual manner. The construction of the casing has merely been indicated diagrammatically and no attempt has been made to show how the casing is built up because the invention relates to the valve stem and the inner tube and the casing has merely been shown for the purpose of better illustrating the invention.

The inner tube consists of a tubular section 7 that is preferably constructed from several plies of cord fabric. As far as this invention is concerned, the tube 7 may be of ordinary rubber, such as is commonly used in inner tubes. Attached to the tube 7 is an outer tube 8 of the usual inner tube material. Duplex inner tubes, constructed substantially in the manner shown, are old, but the air chambers are usually in communication with each other through a small opening so that air may leak from one to the other, thereby equalizing the pressures in the two chambers. The inner chamber has been designated by letter A and the outer by letter B. Inner tubes of this general construction, as above stated, are old, but the manner in which they are inflated differs from the one shown in the drawing, and which will be herein described. In the old construction, an ordinary valve stem communicates with chamber A and the air is introduced into this chamber and passes through the opening above referred to into chamber B. It is evident that if a tube constructed in the manner above described is perforated so as to let the air escape from chamber B, the air will also escape from chamber A but will be retarded somewhat due to the restricted area of the communicating opening.

In the present construction, a new type of valve stem and valve assembly has been shown which makes it possible to separate the chambers A and B so that air cannot normally pass from one to the other. The improved valve stem and valve assembly comprises a unitary tubular member 9 that is preferably straight and is provided with a cylindrical opening passing entirely through the member from one end to the other. The opening consists of two sections 10 and 11 which are of different diameters. Section 10 begins at the outer end of the valve stem and has a threaded surface 12 that terminates in a frusto conical surface 13 which, in turn, terminates in a cylindrical surface 14. Located in the section 10 is a valve inside of the type known as "Dill." Section 11 is of smaller diameter than the section 10 but has similarly formed surfaces. Threaded surface 12a and a frusto conical surface 13a correspond to surfaces 12 and 13 near the outer end. Located in the section 11 is another valve assembly similar to that located at the outer end but of somewhat smaller diameter. The reason for having the valve assemblies or insides of different diameters is that it must be possible to insert and remove both from the outer end of the valve stem, and this makes it necessary that the root portions of threads 12a shall not exceed in diameter the inside diameter of the cylindrical section 14. A tubular portion 15, which is preferably integral with stem 9, projects laterally from the valve stem near its inner end and the opening in this lateral projection communicates with the interior of the valve stem at a point between the two valve insides forming a branch opening. The point where the branch opening to the lateral projection communicates with the interior of the valve stem has been designated by reference numeral 16. Although the lateral projection has been shown near the inner end of the valve stem, this is not a necessary condition as it may be located at any convenient distance from either end of the valve stem, the important consideration being that the lateral or branch opening shall communicate with the interior of the valve stem at a point between the valve insides.

The two valve insides are so positioned that they are in axial alignment and so spaced that the inner end 17 of the movable portion of the outer valve terminates a short distance from the inner end of the corresponding portion of the inner valve assembly, and therefore, when an air chuck is applied in the usual manner, it will move the outer end 19 of the outer valve assembly inwardly, thereby engaging the outer end of the corresponding portion of the inner valve assembly and opening it so as to permit air to flow freely into chamber A. During inflation, it is evident that air will flow through the branch opening into chamber B through passage 20, and also through the inner valve into chamber A. The two chambers are therefore simultaneously inflated and will be inflated to substantially the same pressure, because if chamber B receives more than its proper proportion of air in the beginning due to the larger passageway, this condition will soon be equalized because the two chambers are in direct communication through the inner valve assembly, which is held open during inflation.

It is desirable to maintain the pressure in chamber B during the inflation, and for this purpose opening 16 may be restricted to such a degree that it offers more resistance to flow than the open inner valve inside, by this means the tube 7 can be kept extended during inflation.

If the inner valve inside is not absolutely tight no harm results and it may even be desirable to have a slight leakage here in order to permit slow deflation of chamber A in case of a puncture.

If a suitable cap is screwed onto the end of the stem, after the tubes have been inflated, and provided with means for holding the valves open, a complete equalization of pressures in chambers A and B can be effected in a short time. Such cap must, of course, be removed before the tire is put into service as it is difficult to make it air tight.

If it is desired to remove the tire from the rim, the duplex inner tube can be deflated by merely opening the two valves in the manner usually employed in deflating an ordinary tire because when the outer valve is opened, it will open the inner valve and thereby permit simultaneous deflation of both chambers.

Attention is called to the fact that the opening through the valve stem is straight and that the two valve insides are in axial alignment and it is therefore possible to effect an opening of the inner valve by merely opening the outer one in the usual manner. This construction makes it possible to produce a valve of a very simple construction that is especially well adapted for use in inflating and deflating duplex inner tubes.

Let us now assume that a tire is equipped with a duplex tube having a valve stem and valve assembly herein described associated therewith in the manner shown in Fig. 1, and that the casing and the tube 8 are punctured so as to permit air to escape from chamber B. The air may escape freely from chamber B without escaping from chamber A because the two chambers are separated by a valve inside or assembly in such a way that no air can flow from chamber A to chamber B. Since there is very little, if any, possibility of air escaping from chamber A, it is evident that even if all of the air escapes from chamber B, the air in chamber A will remain and if tube 7 is made from several plies of cord fabric, it will be sufficiently strong to support the weight of the car and permit it to be driven for a considerable distance, and this is a great convenience because the driver can then select a suitable place for changing tires, and may even continue for several miles until he gets to a filling station or garage. If the inner tube 7 is made of ordinary inner tube material, its wall will expand when the pressure in chamber B decreases and will finally fill the inside of the casing, but in either case, the air will be retained in such a way that the danger of serious accident will be obviated and the driver will be in position to bring the car to a suitable place for repairs.

Particular attention is again called to the fact that the unitary valve stem is straight and so constructed that two standard valve insides can be employed and so that both of these insides can be inserted and removed through the outer end of the valve stem. This construction of valve stem makes it cheap to manufacture and convenient to operate because it will fit standard air trucks now in use.

Although a certain well known valve inside is shown, it is evident that the invention is not dependent on the particular valve insides used and any other check valves may therefore be substituted for the ones shown. The type of valve insides shown is, however, very well suited for use in this valve stem on account of their shortness.

Having described the invention what is claimed as new is:

1. A valve stem for use in simultaneously inflating and deflating duplex inner tubes comprising, a stem having a substantially straight opening extending throughout its length and a lateral projecting portion provided with an opening, communicating with the opening in the stem at a point intermediate its ends, the diameter of straight opening between the outer end of the stem and the branch opening being larger than that part between the lateral opening and the inner end of the stem, the stem having two aligned valve assemblies opening in the same direction, one on each side of the lateral opening; and means for simultaneously opening both valves.

2. A valve stem and valve assembly for use in simultaneously inflating and deflating duplex inner tubes, comprising, a substantially straight tubular stem having a tubular lateral projection on one side, the opening in the tubular projection communicating with the opening in the stem at a point spaced from the ends thereof, the diameter of the opening in the valve stem being greater on the outside of the valve stem than on the inside thereof, a check valve assembly positioned in the valve stem on each side of the lateral opening, the valves opening in the same direction, and means carried by one valve assembly for opening the other valve when it is moved to open position whereby two chambers may be simultaneously inflated to the same pressure and simultaneously deflated.

3. A valve stem for use in simultaneously inflating and deflating the two chambers of a duplex inner tube comprising a substantially straight tubular valve stem, formed from a single piece of material, a tubular projection on one side thereof, the opening in the projection communicating with the opening in the stem, the diameters of the opening in the valve stem being larger on the outside of the lateral opening than on the inside thereof, the wall of the larger opening having a threaded section extending inwardly from the outer end, and terminating in a smooth tapered wall section, the section of smaller diameter having a threaded section extending from the end adjacent the lateral opening and terminating in a smooth tapered wall section.

4. A valve stem and valve assembly for use in simultaneously inflating and deflating the two chambers of a duplex inner tube comprising a substantially straight, unitary, tubular valve stem, a tubular projection on one side thereof, the opening in the projection communicating with the opening in the stem, the diameters of the opening in the valve stem being larger on the outside of the lateral opening than on the inside thereof, the wall of the larger opening having a threaded section extending inwardly from the outer end, and terminating in a smooth tapered wall section, the section of smaller diameter having a threaded section extending from the end adjacent the lateral opening and terminating in a smooth tapered wall section, and a check valve assembly operatively associated with each threaded section and associated tapered wall section.

5. A valve stem and valve assembly for use in simultaneously inflating and deflating a duplex inner tube comprising, a substantially straight, unitary tubular valve stem having a branch passage communicating with the interior thereof at a point adjacent its middle, a check valve assembly positioned in the opening in the stem at each side of the branch passage, the diameter of the opening on the outside of the branch passage being greater than that on the inside thereof, the valves opening in the same direction, and means on one valve for opening the other, whereby both valves can be simultaneously opened for inflating and deflating a duplex tube.

6. A unitary valve stem for use in inflating and deflating an air chamber and having its inner end in communication therewith, comprising, a tubular member having a straight opening extending therethrough, the wall of the opening having two longitudinally spaced threaded sections and an inwardly tapered surface adjacent the inner end of each threaded section, the smaller diameter of each tapered surface being slightly smaller than the inside diameter of the adjacent threaded section, the root diameter of the threads in the inner threaded section being slightly smaller than the smaller diameter of the outer tapered opening, whereby an inner valve assembly can be inserted through the outer threaded and tapered section.

ALFRED E. ECKENROTH.